Jan. 7, 1958     J. J. THOMAS     2,819,181
METHOD OF MAKING PAPER CARRIER SHEET
FOR THERMOPLASTIC AND ELASTIC FILM
Filed Feb. 11, 1954
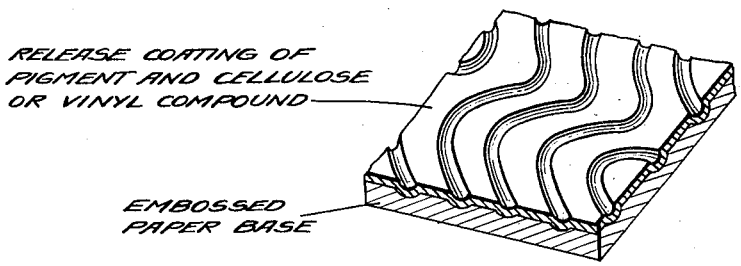
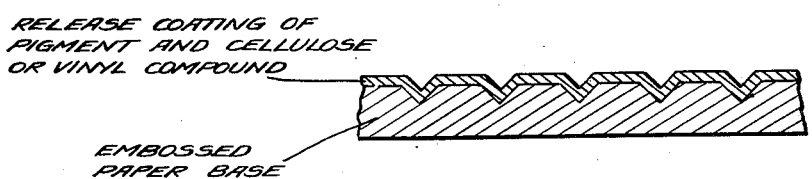
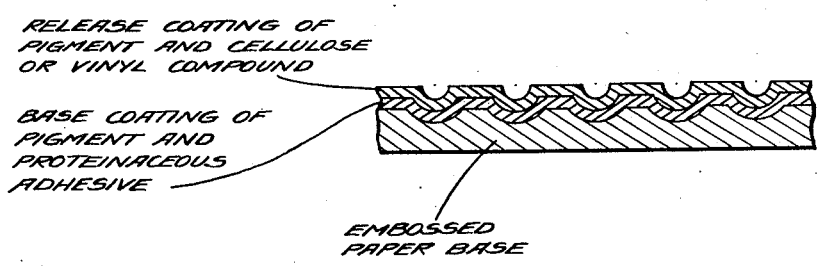
INVENTOR
Joseph J. Thomas
BY Pierce, Scheffler & Parker
ATTORNEYS

2,819,181

METHOD OF MAKING PAPER CARRIER SHEET FOR THERMOPLASTIC AND ELASTIC FILM

Joseph J. Thomas, Westbrook, Maine, assignor to S. D. Warren Company, Boston, Mass., a corporation of Massachusetts Application February 11, 1954, Serial No. 409,765

5 Claims. (Cl. 117—11)

This invention relates to a coated carrier sheet for thermoplastic and/or elastic film material, and to a process for its manufacture.

It is common present practice to prepare thin films of thermoplastic and/or elastic material by applying the material in a liquid solvent or suspending medium to the surface of a coated paper carrier sheet or web, passing the sheet carrying the said liquid material through a heated zone to evaporate the liquid medium and/or to fuse the material into a continuous film, and finally stripping the thermoplastic and/or elastic film from the carrier sheet. In many cases the composite sheet of carrier and film is subjected to additional manipulation or treatment before separation of film and carrier.

For successful operation the carrier web providing the surface to which the thermoplastic-containing liquid is applied must have certain essential qualities. The base itself must have sufficient strength to carry the film through the process without being torn or ruptured. The coated surface of the paper base must not pull away from the paper base when the thermoplastic and/or elastic film is stripped therefrom. The coated surface of the paper must be entirely free from cracks through which the thermoplastic material can penetrate to the underlying portions of the support. Moreover, the coated surface must be one to which the thermoplastic material will adhere sufficiently to be carried or supported thereon, but from which the finished film may be easily stripped without damage to or distortion of either the film or the support.

One support or carrier-web having the qualities beforementioned and which is in extensive use is disclosed in my copending application Ser. No. 143,163, filed February 8, 1950, now Patent No. 2,676,118. Such a suitable support may be a paper web having a surface coating comprising a cellulose derivative, such as methyl cellulose, and an intermediate or anchoring coating layer comprising hydrophilic adhesive material. The film stripped from such a carrier has a flat and level surface which is very satisfactory for many purposes.

In some cases, however, it is desirable that the surface of the film stripped from the carrier shall not be flat and level, but instead that the surface shall be irregular, wrinkled, or rugose. A specific instance where such irregularity or rugosity of surface is desirable is when the film is to be used as surgical adhesive tape or as backing for bandages. For such use it is desirable that the surface stripped from the carrier, which is the surface exposed to view when the tape or bandage is in use, shall simulate human skin in appearance. That is, it is desired that the surface of the film shall exhibit rugosities approximating those of human skin or, which is about as satisfactory, shall have any sort of fine and inconspicuous pattern to eliminate unbroken level areas of appreciable extent. However, the fulfillment of this apparently simple requirement in the manufacture of thermoplastic and/or elastic film has not been easy.

Since the film used as an adhesive or a backing for bandages is customarily coated on its exposed face with a pressure-sensitive adhesive before removal from the carrier sheet or web it cannot expediently be embossed after removal from said carrier. Hence any marking or pattern must be applied while the film is in contact with the carirer, and of course the pattern is desired on the surface which is in contact with the carrier.

It has been attempted to create the desired pattern or rugosity on the film by first embossing the coated paper carrier sheet and then applying thereto the film-forming material in liquid medium. The results of such attempts have been generally unsatisfactory because such embossing of the coated sheet has invariably weakened the coating and in some instances to such an extent that the film applied thereto has been spoiled by fragments of the paper-coating adhering to it when removed from the carrier web.

In many other instances the coating is damaged to a less extent but still sufficiently to permit penetration of weakened areas by the liquid medium of the film forming composition applied thereto. Preferential absorption of plasticizer or other liquid component of such a composition at such weakened areas causes non-uniformity in the finished film and is not permissible if good results are to be obtained.

Likewise trials made by embossing the paper bodystock prior to application of the release coating have been unsuccessful. In the first place such embossing has been found to weaken the bodystock to such an extent that a much heavier and therefore a more expensive bodystock has had to be used. Moreover it is found that the action of subsequently applied aqueous coating composition upon such embossed paper bodystock is such that the strains imposed by the embossing are relieved to an unpredictable extent so that the paper tends to flatten out again with a substantial but uncontrollable elimination of the embossed pattern without, however, any recovery in strength.

It has now been found that a comparatively shallow marking or pattern impressed upon the formed but still wet paper web will carry through the steps of drying and subsequent rewetting by aqueous coating composition without being eradicated, and that a thermoplastic or elastic film cast upon the resulting sheet will part therefrom carrying the pattern in reverse.

In the usual process of making paper a very dilute paper-making furnish is run out upon a moving metal screen through which most of the water drains and upon which the fibers and other suspended matter in the furnish are filtered out to form a paper web. The formed web, which still contains water amounting to several times the weight of solid matter, is then passed between one or more pairs of wringer-rolls or pressrolls, through the first pair of which the exceedingly weak, wet web is carried on an absorbent woolen "felt" or blanket. This pressing operation removes all the water that is easily removable by mechanical means, but leaves the sheet still containing about twice as much water as solid matter. The web is then passed over heated drier drums which evaporate the remaining water.

In carrying out the invention paper made as described is, subsequent to the initial pressing operations but prior to drying on the drier drums, and while it still contains from about 58% to about 74%, preferably 60 to 70% of water, subjected to pressure comparable to that previously used in the preceding pressing operation, between a pair of press-rolls one of which has engraved, cut, or machined thereon a pattern substantially identical with that which is desired to be produced on a cast thermoplastic or elastic film. The patterned roll forms shallow indentations in the wet web. The so-impressed web is then dried in conventional fashion. The impressed pattern persists through the drying treatment and will even persist through a light calendering treatment if one is applied.

The dried web is next coated with a substantially uniform layer of aqueous coating composition comprising a film-forming release agent such as polyvinyl alcohol or cellulose derivative. In some cases it may be preferable to apply an anchoring coating containing proteinaceous or other adhesive which bonds firmly to cellulose fiber and mineral filler before applying the layer of film-forming release coating. To achieve the desired results it is necessary to use for laying down the coating or coatings on the patterned web a method of coating capable of applying the coating in a layer of substantially uniform thickness so that the underlying pattern will not be obscured thereby. A uniform layer can be sprayed on; but the preferred method of applying the coating in a substantially uniform layer is by the use of an air-knife coater such as that described in U. S. Patent No. 2,139,628 of K. E. Terry. A transfer-roll coater and other conventional roll-coating machines are also usable.

It is found that such coatings uniformly applied and subsequently dried follow the contour of the rugose, ridged, or reticulated paper base, and in turn impart the pattern, in reverse, to a thermoplastic film cast thereon. Thus the finished thermoplastic film carries a pattern which is a substantial facsimile of the pattern on the engraved roll or die used to impress the wet paper web. At the same time, since no strains are set up either in the paper after it has been dried or in the release coating, the strength of neither the paper base nor the release coating is impaired in the least. The patterned carrier sheet substantially has all the good and desirable qualities of a smooth or unpatterned carrier sheet and at the same time carries a pattern desired but not in the past successfully attainable without impairment of other requisite qualities in the sheet.

The invention is illustrated in the accompanying drawings in which:

Fig. 1 is a perspective view of a fragment of an embossed paper base having a release coating thereon containing pigment and a cellulose or vinyl compound, Fig. 2 is a cross section of the structure shown in Fig. 1, and Fig. 3 is a cross section of a structure consisting of an embossed paper base, a base coating consisting principally of a pigment and a proteinaceous adhesive and a release coating consisting principally of a pigment and a cellulose or vinyl compound.

An embodiment of the invention is the following Example 1:

A paper-making furnish comprising long wood pulp fibers, a small proportion of rosin-size, and alum was run out into a paper web having a basis weight when dry of about 90 pounds per ream of 500 sheets cut 25 x 38 inches in size. The wet web was pressed against a woolen felt in conventional manner and was thereafter and before being passed to the driers and while it still contained 60 to 70% of water pressed against a surface bearing a reticular pattern which was thereby impressed in the surface of the wet web. The web was then dried in conventional manner e. g. by passage over heated drier drums, and was found to still retain the reticular pattern on its surface. The dried web was then coated on one side by means of a roll coating machine with 10 pounds per ream, dry weight, of an aqueous coating composition represented by the following formula in parts dry weight.

| | |
|---|---|
| Polyvinyl alcohol (low viscosity) | 100 |
| Clay | 50 |
| Octyl alcohol | 2 |

Water to make solids content about 10%.

This polyvinyl alcohol coating may serve as the release coating and since it has sufficient adherence to the paper base may be used alone without a base or anchoring coating or it may be applied as a release coating over an anchoring coating such as that disclosed below in Example 2. However since polyvinyl alcohol is inferior to methyl cellulose as a release agent it is preferred to use the above polyvinyl alcohol coating as the anchoring coating and to apply a release coating as follows.

The coated web was dried and again coated on the same side with about 4 pounds per ream, dry weight, of the following composition in parts by weight.

| | |
|---|---|
| Methyl cellulose | 75 |
| Clay | 50 |
| Ethylene glycol | 50 |
| Butanol | 12 |
| Tributyl phosphate | 1.5 |
| Water | 1700 |

The so-coated web was then again dried and to the so-coated surface was applied a layer of a plastisol dispersion of a vinyl resin made by copolymerization of vinyl chloride with a small proportion of vinyl acetate, and containing a small quantity of titanium dioxide and red lake pigment to confer opacity and pink color to the film. The composite web was then heated to consolidate the plastisol into a film, a pressure-sensitive adhesive was applied to the exposed surface of the consolidated film, and the film was then stripped from the carrier web and found to carry a reticulated pattern in the surface stripped away.

A plastisol is a dispersion of powdered resin in a non-volatile liquid which does not dissolve the resin at ordinary temperature, but does dissolve it at elevated temperature, and which when once heated and then recooled yields an homogeneous film of plasticized resin. Generally the proportions are regulated so that the cooled film is hard and dry, but flexible. A "plastisol" differs from an "organosol" in that the vehicle is substantially non-volatile, i. e. it is a liquid plasticizer; while the vehicle of an organosol usually is at least partially evaporated upon heating.

Another embodiment of the invention is the following Example 2:

A paper-making furnish comprising long and short wood pulp fibers, a small proportion of clay filler, rosin-size, and alum was run out into a paper web having a basis weight when dry of about 70 pounds per ream of 500 sheets cut 25 x 38 inches in size. The wet web was pressed against a woolen felt in conventional manner and was thereafter and before being passed to the driers and while it still contained 60–70% of water, pressed against a roll engraved with a rugose pattern simulating grained leather. The web was then dried. To the dried web was then applied by means of an air-knife coater about 8 pounds per ream, dry weight, of an anchoring coating of the following composition in parts by weight:

| | |
|---|---|
| Soybean flour | 90 |
| Caustic soda | 4.5 |
| Clay | 180 |
| Tributyl phosphate (defoamer) | 1.5 |

Water to make solids content about 17%.

The coated web was dried, and then there was applied over the coated surface by means of an air-knife coater about 4 pounds per ream, dry weight, of the following composition:

| | |
|---|---|
| Methyl cellulose, low viscosity | 150 |
| Clay | 150 |
| Diethylene glycol | 38 |
| Tributyl phosphate | 1 |
| Butanol | 25 |

Water to make non-aqueous content about 8%.

The coated web was dried. It was found that the pattern in the surface of the bodystock was substantially unchanged in the surface of the coating. To the so-coated web was applied a layer of the plastisol dispersion described under Example 1. This was heated to cause consolidaiton of the plastisol film, cooled, and subsequently coated with pressure-sensitive adhesive. The resulting adhesive tape was then stripped from the paper carrier web and was found to exhibit on the surface stripped from carrier a rugose pattern similar to grained leather.

While the patterned supporting sheet disclosed has particular advantages for producing patterns on plastic adhesive tape, it likewise offers advantages for use in supporting other thermoplastic film material, e. g. plastic draperies and films to be used to cover textile or other material, e. g. imitation leather.

In addition to the polyvinyl alcohol and methyl cellulose release coatings disclosed above release coatings containing other materials such as other water soluble cellulose ethers e. g. hydroxy ethyl cellulose and salts of carboxymethyl cellulose may be used. With all such release coating materials it is preferred, as appears in the foregoing examples, to use a humectant such as glycerine or glycol in quantity amounting to at least about 10% based upon the weight of the film forming release agent in the coating. Whether or not the humectant is present in the finished coating it aids in the production of a crack-free coating.

Examples of additional top or release coating components are the following, the parts being by weight.

| | |
|---|---|
| Methyl cellulose | 150 |
| Clay | 150 |
| Diethylene glycol | 38 |
| Tributyl phosphate | 1 |
| Butanol | 25 |

Water to make non-aqueous content about 12%.

| | |
|---|---|
| Methyl cellulose | 100 |
| Clay | 100 |
| Diethylene glycol | 25 |
| Butanol | 18 |

Water to make solids content about 18%.

| | |
|---|---|
| Sodium carboxymethyl cellulose | 100 |
| Clay | 100 |
| Diethylene glycol | 20 |
| Butanol | 15 |
| Tributyl phosphate | 1 |

Water ot make solids content about 7%.

| | |
|---|---|
| Polyvinyl alcohol | 100 |
| Clay | 50 |
| Glycerine | 10 |
| Butanol | 15 |
| Tributyl phosphate | 1 |

Water to make solids content about 8.5%.

| | |
|---|---|
| Hydroxyethyl cellulose | 100 |
| Clay | 125 |
| Ethylene glycol | 40 |
| Butanol | 15 |
| Tributyl phosphate | 1 |

Water to make solids content about 6.5%.

Additional examples of suitable top coatings and base coatings are disclosed in my application Serial No. 143,163 referred to above.

I claim:

1. Process for the production of a coated carrier sheet for thermoplastic and elastic film materials, said sheet having an embossed surface, which comprises applying to a dry paper web a strongly adherent release coating of substantially uniform thickness of an aqueous mineral coating composition consisting essentially of a pigment and a hydrophilic adhesive which is a film-forming release agent of the group consisting of water-soluble cellulose and vinyl compounds; and drying the coated web, said dry paper web having an embossed surface formed by compacting portions of a web of initially substantially uniform thickness more than other portions while the web contained from about 58% to about 74% by weight of water and drying.

2. Process as defined in claim 1 in which the release coating comprises an organic humectant.

3. Process as defined in claim 1 in which the hydrophilic adhesive is polyvinyl alcohol.

4. Process as defined in claim 1 in which the hydrophilic adhesive is methyl cellulose.

5. Process as defined in claim 1 in which the release coating is applied over an anchoring base coating comprising a proteinaceous adhesive.

References Cited in the file of this patent

UNITED STATES PATENTS

| | | |
|---|---|---|
| 361,849 | Taylor | Apr. 26, 1887 |
| 1,582,838 | Lorenz | Apr. 27, 1926 |
| 2,221,200 | Perry | Nov. 12, 1940 |
| 2,248,233 | Heritage | July 8, 1941 |
| 2,676,118 | Thomas | Apr. 20, 1954 |

OTHER REFERENCES

Pulp and Paper Manufacture, vol. 3, p. 4, pub. by McGraw-Hill, New York (1953).